(12) United States Patent
Lhommeau et al.

(10) Patent No.: US 11,333,572 B2
(45) Date of Patent: May 17, 2022

(54) METHOD AND SYSTEM FOR DETECTING DAMAGE TO THE MOBILE BLADES OF AN AIRCRAFT

(71) Applicant: SAFRAN AIRCRAFT ENGINES, Paris (FR)

(72) Inventors: Tony Lhommeau, Moissy-Cramayel (FR); Lorris Michel Cognot, Moissy-Cramayel (FR); Alméric Pierre Louis Garnier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 101 days.

(21) Appl. No.: 16/969,006

(22) PCT Filed: Feb. 11, 2019

(86) PCT No.: PCT/FR2019/050295
§ 371 (c)(1),
(2) Date: Aug. 11, 2020

(87) PCT Pub. No.: WO2019/155716
PCT Pub. Date: Aug. 15, 2019

(65) Prior Publication Data
US 2021/0025779 A1 Jan. 28, 2021

(30) Foreign Application Priority Data
Feb. 12, 2018 (FR) ...................................... 1851167

(51) Int. Cl.
*G01M 5/00* (2006.01)
*F01D 17/06* (2006.01)
(Continued)

(52) U.S. Cl.
CPC ........... *G01M 5/0016* (2013.01); *F01D 17/06* (2013.01); *F01D 21/003* (2013.01); *G01M 15/14* (2013.01);
(Continued)

(58) Field of Classification Search
CPC ..... G01M 5/0016; G01M 15/14; F01D 17/06; F01D 21/003; F01D 21/14;
(Continued)

(56) References Cited

U.S. PATENT DOCUMENTS 7,941,281 B2 * 5/2011 Rai ...................... F01D 21/003
702/34
9,045,999 B2 * 6/2015 Badami ............... F04D 27/0292
(Continued)

FOREIGN PATENT DOCUMENTS

| FR | 2 968 038 A1 | 6/2012 |
|---|---|---|
| FR | 2 986 269 A1 | 8/2013 |
| WO | WO 2016/062946 A1 | 4/2016 |

OTHER PUBLICATIONS

International Search Report as issued in International Patent Application No. PCT/FR2019/050295, dated Jun. 13, 2019.

*Primary Examiner* — Kenneth Bomberg
*Assistant Examiner* — Adam W Brown
(74) *Attorney, Agent, or Firm* — Pillsbury Winthrop Shaw Pittman LLP

(57) ABSTRACT

A method for detecting damage to one or more mobile blades of an impeller of an aircraft engine, includes measuring the speed of the engine, and for each blade acquiring, by a plurality of sensors, measurements of blade-tip passage times; calculating for each sensor, a deflection of the blade tip; extracting a dynamic component of deflection for each of the calculated deflections; detecting the number of functioning sensors; selecting the dynamic components to be
(Continued)

processed based on the detecting step; determining, for at least one blade, a variation of the dynamic behavior of the blade for each functioning sensor; and, for each blade for which a variation of the dynamic behavior has been determined, identification of potential damage to the blade.

13 Claims, 3 Drawing Sheets

(51) Int. Cl.
 *F01D 21/00* (2006.01)
 *G01M 15/14* (2006.01)
(52) U.S. Cl.
 CPC ...... *F05D 2220/36* (2013.01); *F05D 2260/80* (2013.01); *F05D 2270/334* (2013.01); *F05D 2270/821* (2013.01)
(58) Field of Classification Search
 CPC ........... F05D 2260/80; F05D 2270/334; F05D 2270/821; F05D 2230/72; Y02T 50/60
 See application file for complete search history.

(56) References Cited

U.S. PATENT DOCUMENTS

| | | | | |
|---|---|---|---|---|
| 10,487,683 | B2* | 11/2019 | Gerez | F01D 21/04 |
| 2006/0122798 | A1 | 6/2006 | Teolis et al. | |
| 2009/0177363 | A1* | 7/2009 | Kulczyk | G01P 3/481 |
| | | | | 701/100 |
| 2010/0114502 | A1* | 5/2010 | Badami | F03D 17/00 |
| | | | | 702/35 |
| 2011/0010108 | A1* | 1/2011 | Bhattacharya | F01D 21/003 |
| | | | | 702/34 |
| 2011/0320137 | A1* | 12/2011 | Rajagopalan | F01D 21/003 |
| | | | | 702/34 |
| 2011/0320138 | A1* | 12/2011 | Rajagopalan | F01D 21/003 |
| | | | | 702/34 |
| 2013/0197747 | A1* | 8/2013 | Tourin | F01D 21/04 |
| | | | | 701/34.4 |
| 2014/0100798 | A1 | 4/2014 | Guan et al. | |
| 2015/0081229 | A1* | 3/2015 | Yu | G01B 21/16 |
| | | | | 702/33 |
| 2016/0281528 | A1* | 9/2016 | Penda | F01D 25/24 |

* cited by examiner

METHOD AND SYSTEM FOR DETECTING DAMAGE TO THE MOBILE BLADES OF AN AIRCRAFT

CROSS-REFERENCE TO RELATED APPLICATIONS

This application is the U.S. National Stage of PCT/FR2019/050295, filed Feb. 11, 2019, which in turn claims priority to French patent application number 1851167 filed Feb. 12, 2018. The content of these applications are incorporated herein by reference in their entireties.

BACKGROUND OF THE INVENTION

The invention relates to the field of monitoring of an aircraft engine, and more particularly to the detection of potential damage to one or more mobile blades on an impeller of an aircraft engine.

The fans of the new generation aircraft engines are equipped with composite blades. The integration of these blades into a fan allows a considerable improvement of its performance and a non-negligible improvement in mass.

However, the monitoring of the state of health of the composite blades has proven complex to implement. Although for metal blades a simple naked-eye inspection allows direct detection of potential damage to them, this type of detection has proven to be limited for composite blades. For example, a shock to a composite blade can cause delamination and internal damage not observable by the naked eye and therefore more difficult to detect. The composite blades being products with a high added value, it is strongly desirable to be able to plan in advance their conditional maintenance in order to reduce the delays and costs of ground maintenance of the aircraft. The planning of this maintenance therefore requires high-performance detection and identification of any potential damage to a blade.

One known method for detecting damage to a blade consists of the use of tip-timing sensors. These sensors detect and count the passage of the blades relative to a time base. The measurements of the tip-timing sensors are then used to calculate the natural frequency of each blade, the natural frequency providing information on the state of health of the blade. This method requires in practice a considerable number of tip-timing sensors to carry out the measurements, as well as considerable computing resources in order to determine the natural frequencies of each blade. This solution is therefore applicable only to the test bed, where the constraints of integration (ex: bulk, mass, available computing resources) are lower. A solution of this type is however not transposable to an on-board system in an aircraft, considering the integration constraints and the computing resources required. A flight-to-flight follow-up of the state of health of the blades is therefore not possible without immobilizing the engine of the aircraft on the ground.

Another known solution for detecting damage consists of monitoring the natural frequency of each blade by means of a "ping test." During this test, each blade is excited by means of a shock-type impulse, a measurement of the impulse frequency response of each of them allowing deducing potential damage. Here again, nevertheless, a method of this type requires immobilization of the engine of the aircraft in order to implement it.

Yet there exists a need for an on-board solution in an aircraft allowing checking the state of health of each of the blades and ensuring follow-up of their state of health from flight to flight. Generally, this need relates to any type of blade, the latter also possibly being made of composite material or of any other material, metal for example.

OBJECT AND SUMMARY OF THE INVENTION

The present invention has as its goal to correct the aforementioned disadvantages.

To this end, the invention proposes a method for detecting damage to one or more mobile blades constituting an impeller of an aircraft engine, the method comprising measurement of the engine speed, and the following steps for each blade:

a) acquiring, by a plurality of distinct and spatially separated sensors, measurements relating to the blade-tip passage time in line with each sensor; and b) calculating, for each sensor, a deflection at the blade tip based on the measurements of the sensor and the engine speed;

the method also comprising the following steps:

c) extracting a dynamic deflection component for each of the calculated deflections;

d) detecting the number of functioning sensors;

e) selecting the dynamic components to be processed depending on the number of functioning sensors detected in step d);

f) determining, for at least one blade, a variation of the dynamic behavior of the blade for each functioning sensor based on the corresponding dynamic component; and g) for each blade for which a variation of dynamic behavior has been determined, identifying damage to the blade when the variation of dynamic behavior determined for this blade is greater than or equal to a variation threshold defining a damage threshold of the blade.

The method described above allows identifying, by means of the measurements of a plurality of sensors, damage to at least one movable blade based on indirect detection of the drift of its natural frequency. This identification is applicable to any type of blade, for example to composite or metal blades. The measurement of the blade passage time in line with each sensor, in correspondence with the knowledge of the engine speed, allows calculating the deflections relative to the tips of each blade and to extract from them their respective dynamic components. Potential drifts of the dynamic behavior of each blade are then monitored by observing potential variations in their dynamic components, the drift of the dynamic behavior of a blade giving an indirect indication of the drift of its natural frequency.

In fact, damage to a blade would lead to a drift in its natural frequency, impacting the measured passage times measured for it by each sensor and therefore leading to drift in the dynamic component of its deflection. Thus, the detection of a drift of the dynamic behavior of a blade, deduced from the variation of its dynamic component, and the combination of it with a predetermined threshold characterizing a state of health of the blade allows concluding, or not, that this blade is damaged.

The potential damage to a blade can therefore be detected without however requiring the calculation of its natural frequency. The method described above is therefore particularly simple to implement and does not necessitate large computing resources. The method above is therefore easily integrable into an on-board system in the aircraft.

Moreover, the step of detecting the number of functioning sensors allows dynamically adjusting the detection of damage to a blade by taking into account the number of functional sensors. In particular, the dynamic components selected depending on the number of functioning sensors, guarantee the durability of the method in the event of failure of one or more sensors. It is for example possible to detect damage to one or more blades in the set of operating ranges of the engine when at least two sensors are functional. In the example of two sensors, in the event of failure of one of the sensors, the detection of damage to one or more mobile blades will be accomplished for the single remaining sensor and for a specified range of speeds of the engine. The method therefore remains durable against the loss of a sensor as long as at least one other sensor remains functional. It is therefore possible to minimize the number of sensors to be used for an on-board solution, by using a minimum of two sensors. However, a greater number of sensors can be used, three for example, in order to guarantee the durability of the method against a possible failure of a sensor and to continue to extract the damage to at least one blade over the set of operating ranges of the engine. Moreover, in this example, in the event of the failure of two sensors, the detection method will remain durable, in the sense that a sensor will ensure the detection of potential damage to at least one blade over one or more predetermined operating ranges of the engine.

In one exemplary embodiment of this method, the step of extracting the dynamic component of each mobile blade comprises a de-contextualization of this component, the de-contextualization including, for the same rotation of the impeller, calculation of the difference between the dynamic component of the impeller and an average of the dynamic components of the other mobile blades of the impeller.

In one exemplary embodiment of this method, if a single functioning sensor is detected in step d), the determining f) and identifying g) steps are implemented for at least one engine speed range for which the set of blades are pre-identified as having the same vibrational behavior, the variation of dynamic behavior being determined in step f) for the set of blades in at least one engine speed range.

In one exemplary embodiment of this method, if the operation of at least two sensors is detected in step d), the determining f) and identifying g) steps are implemented for each mobile blade of the impeller in the set of engine (5) operating speeds, and the method also comprises the following step:
h) confirmation of damage to said blade based on damage identified in step f).

In one exemplary embodiment of this method, damage to the blade is confirmed in step h) only if the measurements of at least two sensors allow identification of the same damage to the blade. In fact, one sensor of a plurality of sensors can be likely to detect a temporary vibrational effect on a blade. The vibrations of this phenomenon, which are damped over time, can however influence temporarily the deflection of the blade, without however being linked to the natural frequency of the blade or affect the state of health of the blade. Confirmation of damage to an identified blade based on several sensors then allows taking into account only information relating to persistent damage to the blade, while ignoring the temporary phenomena detected. Moreover, although the temporary phenomena are ignored here voluntarily, the method described here allows the detection of these phenomena, the latter being able to be stored in a flight follow-up database.

The invention also proposes, according to another aspect, a computer program including code instructions for the implementation of the method summarized above when it is executed by a computer.

The invention also proposes, according to another aspect, a system for detecting damage to one or more mobile blades constituting an impeller of an aircraft engine, the system comprising:
acquisition means configured to measure the engine speed and to acquire, by means of a plurality of distinct and separate sensors, for each blade, measurements relating to the blade-tip passage time in line with each sensor, and
processing means including a calculation module configured to calculate, for each blade, a deflection of the tip of each blade based on the corresponding measurements of the sensor and the engine speed;
the processing means also comprising:
an extraction module configured to extract a dynamic component of deflection for each of the calculated deflections;
a detection module configured to detect the number of functioning sensors;
a selection module configured to select the dynamic components to be delivered to a processing module depending on the number of functioning sensors detected by the detection module;
a processing module configured to determine for at least one blade, a variation of the dynamic behavior of a blade for each functioning sensor based on the corresponding dynamic component;
a comparator configured to identify, for each blade for which a variation of the dynamic behavior has been determined, damage to a blade when the determined variation of dynamic behavior of said blade is greater than or equal to a variation threshold defining a damage threshold of the blade.

In an exemplary embodiment of this system, the dynamic component extraction module of each mobile blade comprises a sub-module for de-contextualizing the dynamic component, configured to accomplish, for the same rotation of the impeller, calculation of the difference between the dynamic component of the mobile blade and an average of the dynamic components of the other mobile blades of the impeller.

In an exemplary embodiment of this system, if the functioning of a single sensor is detected by the detection module, the processing module and the comparator are respectively configured to determine a variation of deflection and to identify damage to a blade for at least one engine speed range for which the set of blades is pre-identified as having the same vibrational behavior.

In an exemplary embodiment of this system, if the operation of at least two detectors is detected by the detection module, the processing module and the comparator are respectively configured to determine a variation of deflection and to identify damage to a blade for each mobile blade of the impeller in the set of engine speed ranges, and the processing means also comprise a validation module configured to validate damage to a blade based on the damage identified by the comparator.

In an exemplary embodiment of this system, the validation module is configured to validate the damage to the blade only if the measurements of at least two sensors allow the identification of the same damage to the blade.

In an exemplary embodiment of this system, the sensors are tip-timing sensors installed in line with said impeller.

In one exemplary embodiment of this system, the processing means are integrated into a specific housing or into an existing electronic housing.

BRIEF DESCRIPTION OF THE DRAWINGS

Other features and advantages of the invention will be revealed by the following description of the particular embodiments of the invention, given by way of non-limiting examples, with reference to the appended drawings, in which.

DETAILED DESCRIPTION OF EMBODIMENTS

Figure 1:
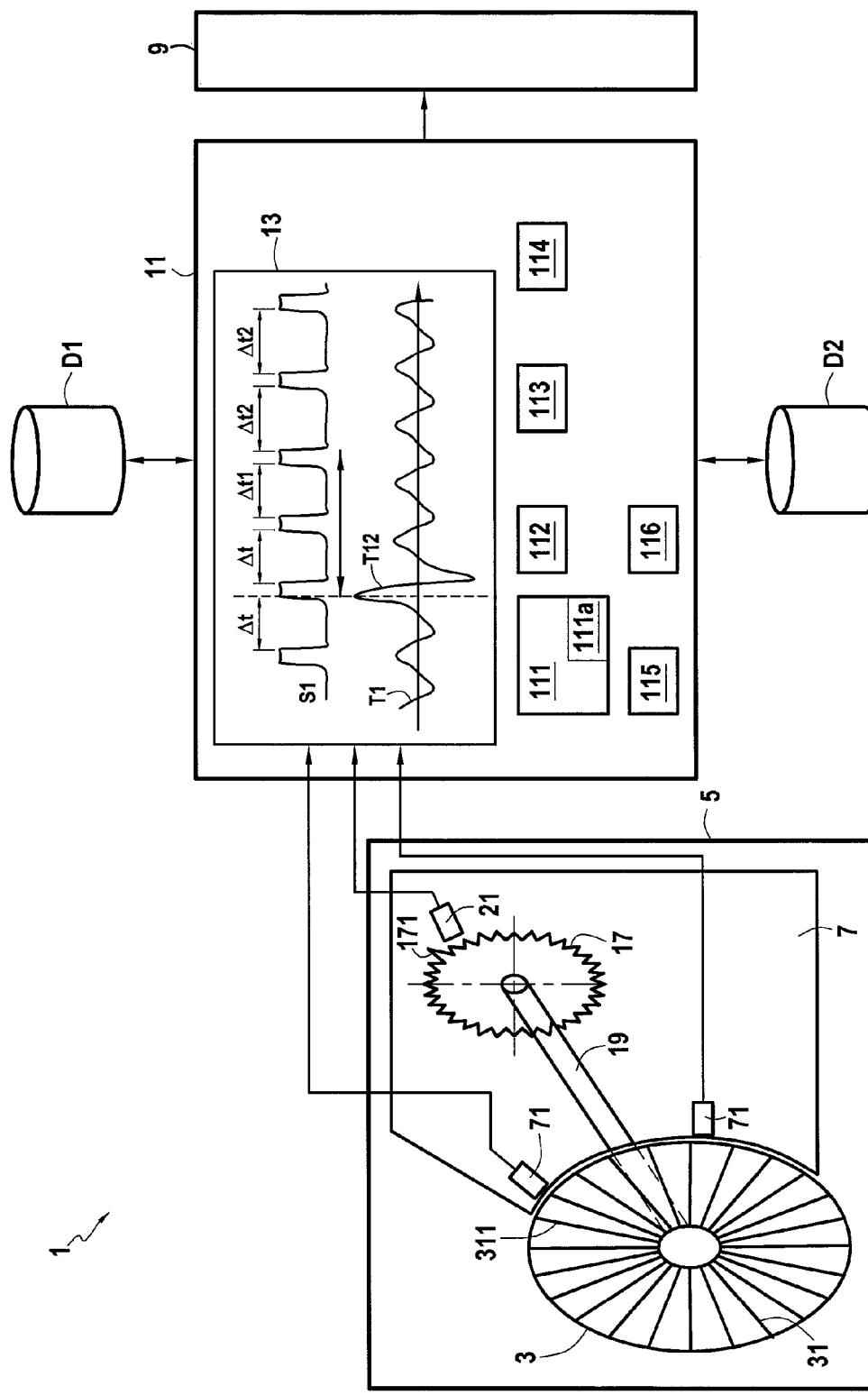
FIG. 1 illustrates schematically a system for detecting damage for the mobile blades of an impeller of an aircraft engine.

FIG. 1 illustrates schematically a system 1 for detecting damage for the mobile blades of an impeller (or blading) 3 of an aircraft engine 5 according to the invention.

This system 1 includes data acquisition means 7, warning means 9, and processing means 11 such as a calculator or computer comprising in particular calculation means.

The processing means 11 are associated with storage means appearing in the form of one or more databases D1, D2. The processing means 11 are also configured to execute a computer program comprising code instructions designed to implement an acquisition, signal processing, analysis, and alarm algorithm according to the detection method of the invention. The processing means 11 can be integrated into a specific housing or into an existing electronic housing. For example, the processing means 11 can be part of the computer or more particularly the digital regulation device of the engine ECU (Engine Control Unit), or of the device for monitoring the state of the engine's health EMU (Engine Monitoring Unit).

The acquisition means 7 include a plurality of sensors 71, two in the example illustrated. However, it is possible to consider a greater number of sensors 71. The acquisition means 7 are particularly configured to acquire, for each sensor 71, a time-varying signal S1 relating to the mobile blades 31 of an impeller 3, for example an impeller of the fan or of any other impeller of the engine 5. Although two sensors 71 are illustrated here, a single signal S1 corresponding to the measurements of a single sensor 71 is shown here for the sake of clarity. However, it is understood that each sensor 71 is associated with a signal S1 belonging to it.

Advantageously, the acquisition means 7 use a "tip-timing" technique for measuring the passage times/instants TOA ("Time Of Arrival") of the mobile blades 31. Customarily this technique is used in test beds to measure the vibrations of movable blades based on the fixed space.

In conformity with the invention and as will be explained later, the acquisition means 7 integrated into the aircraft engine 5 in operation comprise the at least two tip-timing sensors 71 installed on the engine 5 casing, in line with the impeller 3, so as to acquire, for each sensor, a time-varying signal S1 belonging to the sensor 71.

More particularly, each tip-timing sensor 71 detects and counts the passages of the blade tips 31 relative to a time base. Thus, each tip-timing sensor 71 can measure the current passage time between the blades 31 relative to a reference point. For each sensor 71, the passage time (TOA) belonging to each blade 31 can then be deduced from the measured data by the processing means 11, here via a calculation module 13.

In other words, each tip-timing sensor 71 allows acquiring measurements relating to the passage times/instance of the tip of each mobile blade 31 in line with a reference zone of the impeller 3. Moreover, in order to limit the risk of losing sensors 71, it is possible to position the sensors 71 so as to maximize their azimuthal distance, in order to keep them as far away as possible from one another. Thus, in the event of local failure of a sensor 71 (ex: impact of debris on a blade 31, fouling of a sensor 71) the risk that the set of sensors 71 is affected is minimized.

In normal operation, the blades 31 will pass in front of each tip-timing sensor 71 in a regular manner. A time interval Δt will therefore be measured, for each sensor 71, between the passage of two consecutive blades at a given speed.

Conversely, the alteration of the condition of a blade, due for example to wear or to the ingestion of a foreign body FOD ("Foreign Object Damage") can be reflected in a modification of the position of the blade at the moment where it passes in front of at least one of the sensors 71. By way of an example, in FIG. 1 one of the impulses of the signal S1, corresponding to the passage of a blade 311, forming part of the set of blades 31, in line with one of the tip-timing sensors 71, is spaced from the preceding and following impulse by intervals Δt1 and Δt2 that are different from the constant interval Δt, reflecting an alteration of the condition of the blade 311.

In order to be able to identify each blade 31 (independently of its condition), the processing means 11 are configured to analyze the different time-varying signals S1 relative to an angular reference.

The angular reference can be supplied by a "top-turn" sensor installed facing a phonic wheel integral with the impeller. By way of an example, a phonic wheel 17 is coupled to the impeller 3. The phonic wheel 17 is cohesive with the shaft 19 of the engine 5, itself cohesive with the impeller 3 and therefore rotating at the same speed as the latter. One of the teeth 171 of the phonic wheel 17 has a different shape from the others, (longer, for example), to allow a sensor 21 associated with the top turn to have an angular reference. Thus, FIG. 1 illustrates the signal T1 of the phonic wheel 17 with a top turn impulse T12 corresponding to the time-varying signal S1 originating in one of the tip-timing sensors 71.

By comparing the two signals, the processing means 11 can identify with high accuracy each blade 31. In particular, the blade 311 of the preceding example can be identified, via the comparison between the signals S1 and T1, as the third blade relative to the top turn T12.

It is important to specify here that it is desired to later detect a persistent degradation of the performance of one or more blades 31 linked to damage, and not a simple temporary perturbation observable on the signal S1. Thus, the angular reference (top turn T12) described above is only used to identify each of the blades 31 relative to the others. The detection of damage to a blade 31, which will be described later, therefore does not consist here in the simple observation or detection of the variation of the interval Δt between the impulses measured between the blades 31 by each tip-timing sensor 71.

It will also be noted that the engine 5 customarily includes a phonic wheel 17 to measure the engine speed, with a top-turn sensor 21 to identify imbalances. Thus, the detection system according to the invention uses the existing phonic wheel with its top-turn to identify the blades.

As a variant, the angular reference can be generated by at least one of the tip-timing sensors 71 and a singularity on a blade of the impeller itself. This singularity can correspond to a blade having a length or a width different from the other blades, or having a specific shape or a specific applied material.

At least one tip-timing sensor 71 or the top-turn sensor 21 can also be used to measure the speed of the motor 5 of the aircraft.

Each tip-timing sensor 71 can be of the capacitive, inductive, or Foucault current type or even an optical probe, these different types of sensors being robust, accurate and space saving.

The method of detecting, based on the plurality of tip-timing sensors, damage to one or more mobile blades 31 constituting the impeller is now described.

Figure 2:
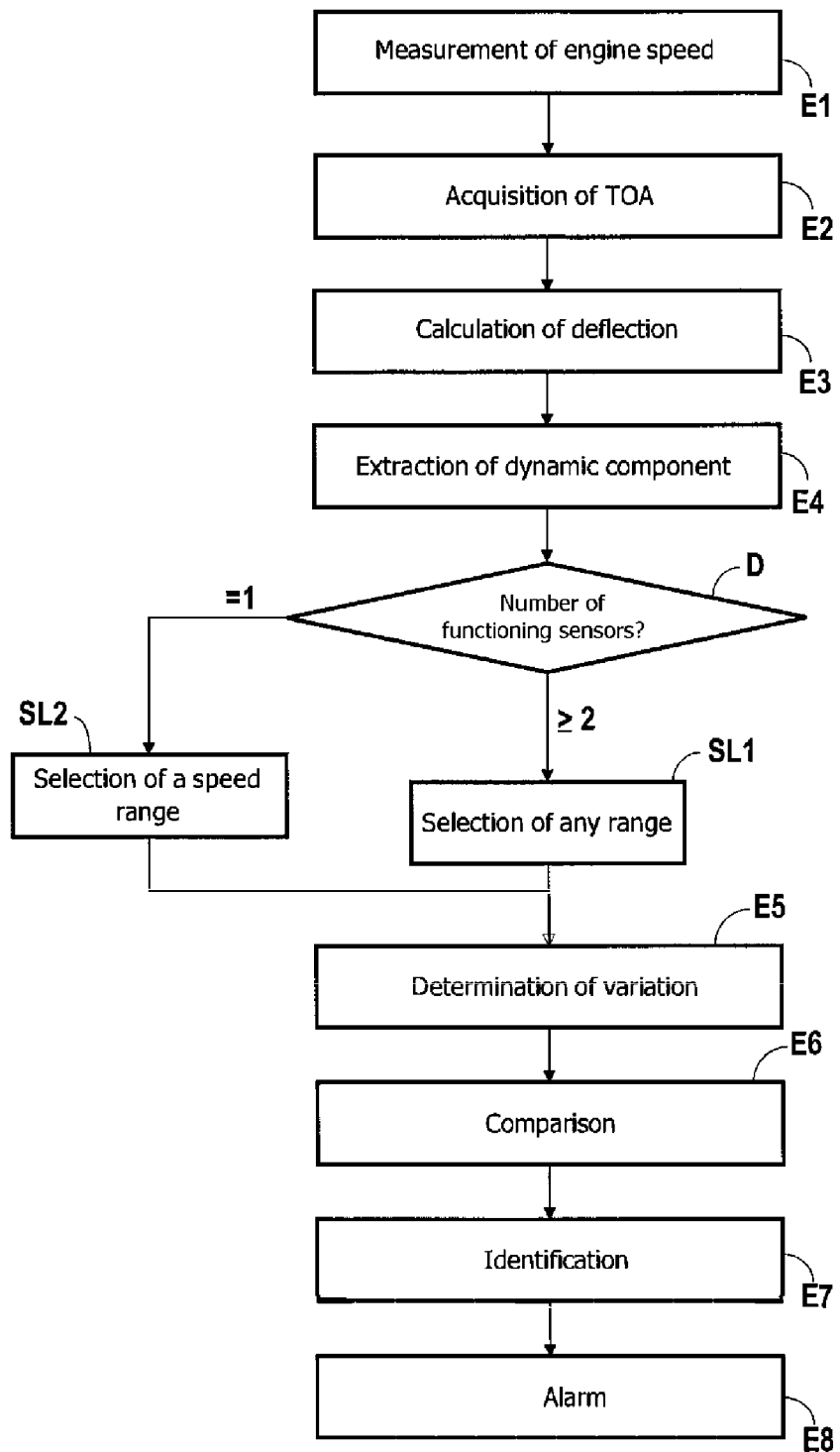
FIG. 2 is a flowchart according to a particular embodiment of the invention, illustrating the steps of a method of detecting damage for mobile blades of an impeller of an aircraft engine, according to the invention.

FIG. 2 illustrates the detection method executed in parallel for each tip-timing sensor 71. This method is therefore placed here from the point of view of a single tip-timing sensor 71, but is executed for the set of sensors.

As illustrated in FIG. 2, this method comprises a step E1 of measuring the speed of the engine 5 accomplished by the acquisition means 7. As explained above, the measurement of the speed of the engine 5 can be accomplished by the tip-timing sensor 71 or the top-turn sensor 21.

In parallel, the tip-timing sensor 71 carries out measurements relative to the passage times/instants of the tip of each mobile blade in line with the sensor. The measurements can, by way of examples, consist of measuring a continuous time-varying signal relating to the passage of the tip of each blade 31 in line with the tip-timing sensor 71. The processing means then perform, via the calculation module 13, conditioning of the measurements originating in the tip-timing sensor 71. This conditioning consists of identifying in real time each blade 31 in the time-varying signal measured by means of an angular reference (ex: the top turn T12), extracting from the time-varying signal the passage time (TOA) relating to an identified blade 31, associating with the identified blade 31 its extracted passage time as well as information relating to its turn number and to the identity of the sensor 71. Thus, the set of operations described above constitutes sub-steps allowing the acquisition of passage times/instants for each blade 31 (step E2).

For each acquisition of a passage time (TOA) of a blade 31, the processing means 11 calculate, via the calculation module 13, a deflection of the tip of this blade (step E3).

What is meant here by deflection is the spatial separation of the tip of the blade 31 relative to its theoretical position at rest. In known fashion this spatial separation is explained by the fact that a blade 31 in rotation has a curvature phenomenon linked to centrifugal force, as well as vibrations around its equilibrium position linked to its environment contrary to a theoretical model considering the blade 31 to be non-deformable in rotation.

The special deflection is calculated based on subtraction between the real measured passage time (TOA) of the blade 31 and a theoretical passage time calculated for it, the result of this subtraction being then related with the tangential speed of the blade 31 for the measured speed of the engine 5. The theoretical passage time of the blade 31 is itself calculated based on the measured speed of the engine 5. The calculation of the theoretical passage time of the blade 31 is well known to a person skilled in the art and is therefore not recalled here.

As will be seen hereafter, it is desired to determine, based on the measurements of each sensor 71, potential variations in dynamic behavior among the mobile blades 31. In known fashion, each deflection can be decomposed into a static component and a dynamic component. Only the dynamic component will be considered here, because it is linked to the natural frequency of the blade 31, this natural frequency allowing detecting any potential degradation of the mechanical properties of the blade 31. In other words, the dynamic component of the deflection of a blade 31 is linked to the dynamic behavior of this blade.

Thus, during step E4, the processing means 11 extract, via an extraction module 111, illustrated in FIG. 1, the dynamic component for each calculated deflection, that is they isolate it from the static component. The extraction of the dynamic component is accomplished by means of known isolation methods of the prior art (ex: averaging, or use of a high-pass filter to extract a high-frequency component).

Moreover, the extraction module 111 also comprises a de-contextualization sub-module 111a. The de-contextualization sub-module 111a is configured to accomplish, during the extracting step, a de-contextualizing sub-step of each dynamic component relative to the flight parameters (ex: engine speed, speed, phases of flight). This de-contextualization has as its object the isolation of the dynamic component of each blade 31 relative to the other blades 31 of the same set, given that in the contrary case the blades of the same set of the impeller 3 are assumed to have the same flight conditions. The de-contextualizing sub-step, accomplished by the de-contextualizing sub-module 111a, then allows isolating the dynamic behavior of each blade 31 by a comparable formulation between each flight, then allowing the use of these data as a baseline. The de-contextualization of the dynamic component of a blade 31 is carried out at each rotation of this blade 31, by taking into account respectively the set of dynamic components of the other blades 31 of the impeller for the same turn number.

More precisely, the de-contextualization of the dynamic component of a blade 31 is accomplished by calculating, for the same turn number, the difference between the dynamic component of the blade 31 and an average of the set of dynamic components of the other blades 31 of the impeller 3. By way of an example, for an impeller comprising N blades 31 and for the same turn number of the set of blades 31 of the impeller 3, the de-contextualization of the dynamic component of a blade 31 numbered i (where i is an integer), is accomplished as follows. After extraction of the set of dynamic components of the blades 31 for the same turn number, the average of the set of dynamic components of the N−1 other blade 31 numbered j, where j is an integer and j≠i, is calculated. The previously calculated average is then deducted from the dynamic component of the blade i, thus allowing de-contextualization of the dynamic component of the blade 31 numbered i. The same type of de-contextualization is also applied to each of the dynamic components of the other blades 31 numbered j. This de-contextualization therefore allows comparing the dynamic behavior of each blade 31 relative to the average dynamic behavior of the set of the other blades of the impeller 3 when they pass in line with the same tip-timing sensor 71 during the same rotation.

Due to the extracting step E4, the processing means 11 detect, during a step D, via a detection module 112, the number of functioning sensors 71 functioning at that instant, i.e. the number of non-failing/assumed-to-operate sensors. What is meant here by an operational sensor 71 is a sensor sending an observable impulse on the signal S1 each time a blade 31 passes in line with it. Of course, the observable impulse in the signal S1 must be usable in order to be able to determine the passage times/instants (TOA) of each blade 31. In known fashion, various methods can then be considered for detecting the failure of a sensor 71.

By way of an example, during passage of a blade 31 in line with the sensor 37, if a saturated signal S1 is observed, or the absence of impulse in the signal S1, or multiple impulses in the signal S1 instead of the single one expected, failure of this sensor 71 is deduced. Detection of failure of a sensor 71 can also relate to the accuracy of its measurement, i.e. the usability of its signal S1. The failure of a sensor 71 can, by way of an example, be detected based on its signal-to-noise ratio. In another example, the failure of a sensor 71 is detected by comparison of its signal S1 to the other sensors; behavior distant from the other sensors allows a failure to be deduced.

In the present method, at least one sensor 71, namely the sensor 71 to which the current iteration of the method is applied, is assumed to function. Due to the detecting step D, two configurations are then under consideration.

According to a first configuration, the number of sensors 71 detected as functional can be greater than or equal to two. At least one other sensor, in addition to the sensor 71 to which the present method applies, is therefore functional. In this configuration, the use of at least two tip-timing sensors 71 advantageously allows the detection of potential damage to one or more blades 31 over the set of operating ranges of the engine 5. Thus, when the number of functioning sensors 71 is greater than or equal to two, a selection module 113 (integrated with the processing means 11), selects, during a step SL1, the dynamic components corresponding to each blade 31 of the impeller 3 for any speed range of the engine 5. The result of this selection SL1 is communicated to a processing module 114 (integrated with the processing means 11), the operations of which are detailed later.

According to a second configuration, the number of sensors 71 detected as functioning during step D is equal to one. Thus, only the tip-timing sensor 71 to which the present method is applied is assumed to be functional. The method then switches into an emergency mode capable of allowing the detection of damage to at least one blade 31 by means of a single functioning sensor 71. To accomplish this, the processing means 11 then carry out, via the selection module 113, a step SL2 of selecting one or more ranges of engine 5 speed for which the set of blades 31 of the impeller 3 are assumed to be synchronous, i.e. assumed to have the same vibrational behavior for the same engine 5 speed range. The engine 5 speed ranges are pre-identified here relative to a reference database, for example the database D1, as guaranteeing that the set of blades 31 has the same vibrational component when they pass in line with the tip-timing sensor 71.

Advantageously, the selecting step SL2 allows conferring durability on the detection method, allowing it to continue to operate in the event of loss of one or more sensors, as long as a single tip-timing sensor 71 remains functional. Thus, thanks to this step, a single tip-timing sensor 71, namely the sensor to which the method applies, is used by the detection system 1. Furthermore, the positioning of this sensor 71 has no importance as long as it remains facing the mobile blades 31 of the impeller 3.

In fact, for one or more pre-identified speed ranges of the engine 5, undamaged mobile blades 31 are expected to have the same behavior with regard to any azimuth of the impeller 3 when passing through a synchronous phenomenon. Consequently, the position of the tip-timing sensor 71 charged with measuring the passage times (TOA) of the tip of each blade 31 does not influence the results. The result of this selection SL2 is communicated to the processing module 114, the operations of which are detailed later.

Only the dynamic components selected during the selecting steps SL1 or SL2 are taken into account in the remainder of the method. Thus, due to the selecting step SL1, the set of dynamic components of the blades 31 is taken into account in the method, independently of the speed of the engine 5, hence for all its speed ranges. Conversely, due to the selecting step SL2, only the dynamic components of one or more speed ranges of the engine 5 for which the set of blades 31 of the impeller 3 are assumed to have the same vibrational component are taken into account for the detection of potential damage.

Due to the selecting step SL1 or SL2, the processing module 114 receives as input the selected dynamic components. The processing module 114 is configured to determine (step E5) a potential variation in the dynamic behavior of one or more blades 31, by determining a variation of the selected dynamic components for each blade 31, and by setting these variations in relation with a baseline database. Additionally, the results of the determining step E5 added to the follow-up database, here the database D2. Thus, the determining step E5 can be seen as a step of analysis of the vibrational dynamic behavior of each blade 31 based on the corresponding dynamic component which was selected following the selecting step SL1 or SL2.

The baseline database is for example the data base D1. This data base comprises in particular different thresholds and measurements linked to the natural frequency of each blade 31 of the impeller 3. The data set of this base serves as a baseline for defining the nominal behavior of each blade 31 and therefore allows characterizing the behavior and the state of health of any blade 31 of the impeller 3.

The baseline database D1 can be constituted during a learning phase, for example during a flight of the aircraft when the engine 5 is new or repaired and the blades 31 do not show any wear. Alternatively, the learning phase can be carried out on the test bed.

For the purpose of constituting the baseline data base D1, the learning phase can be designed so as to allow:
  determining one or more thresholds defining good health or damage to a blade 31, these thresholds being put into correspondence with the dynamic component of its deflection, and therefore indirectly with the natural frequency of the blade 31;
  determining the natural frequencies of each blade 31 based on at least one of the thresholds recorded in the data base D1.

In the method described here, the learning phase has already been executed and the processing means 11 proceed, via a comparator 115, with a comparison step E6 following the determining step E5. The comparison step E6 consists of comparing each variation detected of a dynamic component of deflection of a blade 31, i.e. each variation of its dynamic behavior, with one or more pre-recorded thresholds in the baseline data base D1.

During this step E6, each variation of a dynamic component, and therefore of dynamic behavior, detected for a blade 31, is in particular compared with a first variation threshold, which corresponds indirectly to a state of health of the blade. This first threshold is linked to a second threshold which relates to the variation of the natural frequency of the blade 31, achieving this threshold corresponds to a damage of the blade 31.

The first and second thresholds were determined, then recorded in the baseline data base D1, during an initial learning phase.

The detection of a variation of the dynamic component of the deflection of the blade 31, i.e. the variation of its dynamic behavior, is therefore linked here with the indirect detection of a drift in the natural frequency of this blade 31, this drift, beyond a predetermined threshold, being reflected in damage to it.

Thus, if the variation of the dynamic component of deflection/of the dynamic behavior of the blade 31 is greater than the first variation threshold, that signifies that the natural frequency of the blade 31 itself has a drift reflected in persistent damage to the blade 31. In fact, persistent damage to the blade 31 leads to a drift in its natural frequency and therefore to a drift of the dynamic component of its deflection.

Consequently, when the comparator 115 detects that the variation of the dynamic component of deflection/of the dynamic behavior of the blade 31 is greater than or equal to the first threshold, the comparator 115 identifies (step E7) the blade 31 as being damaged.

An alarm indicating damage to the blade 31 can then be emitted (step E8) intended for the warning means 9 (via, for example, auditory and/or visualization means). Likewise, messages to be sent or to be kept available for maintenance can be triggered during the emission of the alarm.

The method above being described for one sensor 71 and executed in parallel for each sensor 71, it possible that the set of the functioning sensors 71 do not initially identify at the same instant a new occurrence of damage to a blade 31.

In fact, given that it is desired here to detect permanent damage to a blade 31, only concomitant detection over the duration (ex: during the same flight or from flight to flight) by the set of functioning sensors 71 will allow validating the persistent damage to the blade 31.

Conversely, the occurrence of asynchronous and ephemeral events, for example the ingestion of a foreign body impacting a blade 31 and exciting it in an impulsive manner, or the appearance of a transient aero-acoustic phenomenon, can cause temporary vibrations of the blade 31 damped over time, without however leading to a persistent degradation of the latter.

The more sensors are present, the greater the accuracy, and the more potential transient vibrations will be likely to be detected by at least one sensor 71, but not necessarily by all considering vibrational damping. Thus, the more sensors 71 are present, the greater the probability that one or more sensors is likely to detect a variation of the dynamic behavior of a blade 31 linked to a transient phenomenon. The detection of a transient phenomenon can be added to the flight follow-up data base D2 with the identity of the sensor(s) 71 which has(have) detected it. The system 1 therefore allows the detection and the follow-up of transient phenomena.

However, the main object being here to detect persistent damage to one or more blades 31, it is desirable to not generate an alarm due to the detection of a transient phenomenon. Thus the identifying step E7 can comprise substeps aiming to generate or suppress the emission of an alarm.

Figure 3:
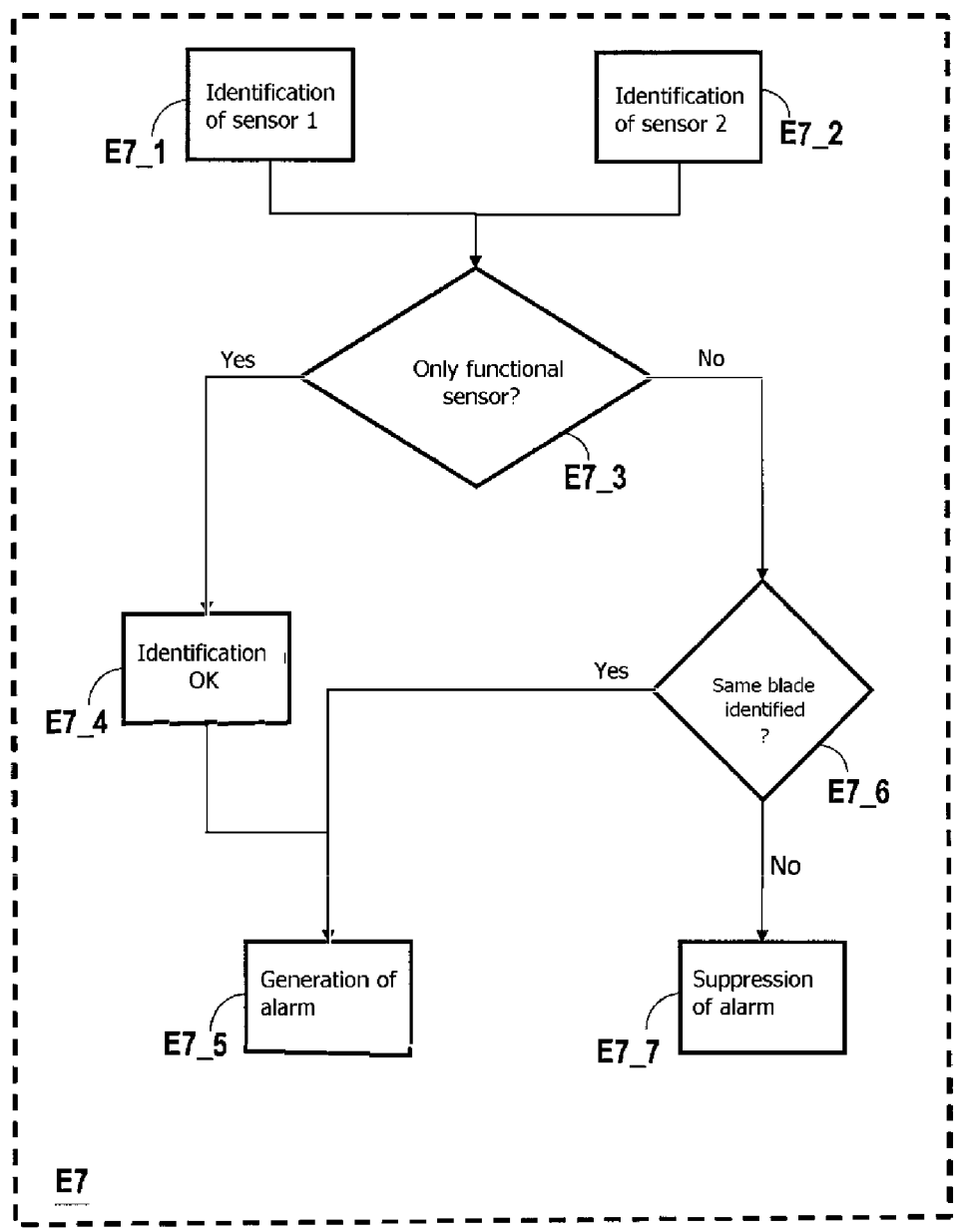
FIG. 3 illustrates an embodiment of the identifying step present in FIG. 2.

These steps are illustrated in FIG. 3 in the example of two sensors 71. The following steps, however, are also applicable to a higher number of sensors 71.

The steps E7_1 and E7_2 consist respectively in recovering first information relating to the blade 31 identified as being damaged based on a first sensor 71 for which the method is executed, here "sensor 1," and at least a second information relating to a blade 31 identified as damaged based on a second sensor 71, here "sensor 2."

Step E7_3 then determines whether a single sensor 71 is functional (emergency mode) based on the result of the detecting step D.

In the case where only a single sensor 71 functions, the identification of the damage to the blade 31 based on the measurements of the first sensor 71, "sensor 1," is confirmed in a step E7_4 b a confirmation module 116 and an alarm relating to this blade 31 is generated in a following step E7_5.

I the case where there is not only a single sensor 71 that functions, i.e. that at least two sensors 71 are functional, the information relating to the blades 31 identified as damaged based on each functional sensor 71 are then compared in a following step E7_6. If the identification of the same blade is common to each sensor 71, i.e. if each of the functional sensors detects damage to the same blade 31, that signifies that persistent damage to this blade 31 has been detected. The damage to the blade 31 detected is then confirmed by the confirmation module 116 and an alarm relating to this blade is generated during step E7_5.

On the other hand, if one of the functional sensors 71 does not identify damage for a blade 31 while the other sensor(s) 71 has (have) identified one, in this exemplary embodiment, no alarm is emitted in a step E7_6. Divergence of identification between sensors 71 for the same blade 31 can occur in two cases. In a first case, as explained above, the sensor 71 having identified damage has in fact detected the occurrence of a temporary phenomenon, and not persistent damage to the blade 31. In a second case, the sensor 71 not having identified damage to a blade 31 has in fact detected a temporary phenomenon which, at the instant of passage of the blade 31 in line with this sensor 71, has compensated the detection of the damage to the blade 31. These events can possibly be added to the flight follow-up data base D2, and an alarm suppression message relating to the blade detected as persistently damaged is generated during a step E7_6. The non-generation of an alarm (step E7_6) relating to the damage to a blade 31 is therefore valid at a precise instant where the detection of a temporary phenomenon by one of the sensors 71 is suspected. Conversely, given that it is desired to detect persistent damage of at least one blade 31, the generation of an alarm (step E7_5) results here from a persistence over time of an identification of damage to the blade 31, detected for example during the same flight or from flight to flight.

Moreover, in order to minimize the emission of false alarms, the comparing step E6 can also implement a succession of sub-steps consisting of isolating the blades 31 likely to be degraded from the blades that are probably sound. This sub-step can be accomplished by comparing by degrees the dynamic behavior observed for each blade 31, for example by comparing variations in the dynamic components of each blade 31 with various reference thresholds which were pre-recorded in the baseline data base D1 during an initial learning phase.

By way of an example, during a learning phase, it is possible to compare, for a blade 31 in a nominal case, i.e. in the absence of damage, the dynamic behavior of this blade 31 relative to the other blades 31 of the impeller 3. The result obtained for this comparison then serves as a behavior reference in the data base D1. During step E6, comparison of the dynamic behavior of this same blade 31 relative to the other blades 31 of the impeller 3 is carried out again. During step E6, the results of the comparisons carried out for the blade 31 during step E6 and of the learning phase are themselves compared. Depending on the separation obtained between the behavior reference determined during the learning phase and the dynamic behavior of the blade 31 determined during step E6, the blade 31 can then be potentially presumed degraded, and isolated.

Still in order to minimize the emission of false alarms, the identifying phase E7 can also comprise a sub-step allowing confirming the damage to a blade 31 via the crossing of thresholds in connection with the presumptions of the comparison step E6 and a purification of false alarms by plausibility. By way of an example, the damage to a blade 31 is confirmed only if the variation of its dynamic component/its dynamic behavior, determined in step E5, is greater than a pre-recorded threshold in the data base D1 and if the blade 31 has been presumed degraded and isolated during step E6.

Advantageously, the method described above allows identifying the damage to at least one mobile blade 31 based on an indirect detection of the drift of its natural frequency. The measurement of the passage times/instances (TOA) of each blade 31 by each sensor 71, and the knowledge of the speed of the engine 5, allow calculating the deflection relating to the tip of each blade 31.

Potential drifts of the dynamic behavior of each blade 31 are then monitored, the drift of the dynamic behavior of a blade 31 giving an indication on the drift of its natural frequency.

Thus the detection of a drift of the dynamic behavior of a blade 31 and the comparison of it with at least one predetermined threshold, characterizing a state of health of the blade, allows concluding or not that this blade 31 is damaged. The potential damage to a blade 31 can therefore be detected without however necessitating the calculation of its natural frequency. The method described above is therefore particularly simple to implement and does not necessitate large computing resources. The integration of the method above is therefore easily integrable into a system on board the aircraft. This method is also applicable to any type of blade, for example to composite or metal blades.

The use of a plurality of sensors 71 also allows conferring durability to the detection method. In fact, even in the event of loss of a sensor 71, the detection of damage to at least one blade 31 remains possible based on a single sensor. Detection of persistent damage to one or more blades 31 based on two sensors therefore proves to be effective and easily integrable.

As disclosed above, detection of damage to at least one blade 31 based on a single sensor 71 corresponds to an emergency mode for a situation where one or more other sensors 71 would have been lost. Ideally, detection based on a plurality of sensors 71 will therefore be preferred, this detection having as an advantage to be able to be carried out over the set of ranges of engine 5 speed. Thus, in order to reinforce the durability of the method, the use in the detection system 1 of three sensors 71 or more can be considered in order to remain, even in the event of failure of one of the sensors, in a multi-sensor detection configuration.

The invention claimed is:

1. A method for detecting damage to one or more mobile blades constituting an impeller of an aircraft engine, the method comprising measuring the engine speed, and the following steps for each blade:
   a) acquiring, by a plurality of distinct and spatially separated sensors, measurements relating to a blade-tip passage time in line with each sensor; and
   b) calculating, for each sensor, a deflection at the blade tip based on the measurements of the sensor and the engine speed;
   wherein the method also comprises the following steps:
   c) extracting a dynamic deflection component for each of the calculated deflections so as to obtain a plurality of dynamic deflection components;
   d) detecting the number of functioning sensors;
   e) selecting one or more of the dynamic deflection components to be processed depending on the number of functioning sensors detected in step d);
   f) determining, for at least one blade, a variation of the dynamic behavior of the blade for each functioning sensor based on the corresponding dynamic deflection component; and,
   g) for each blade for which a variation of dynamic behavior has been determined, identifying damage to the blade when the variation of dynamic behavior determined for said blade is greater than or equal to a variation threshold defining a damage threshold of the blade.

2. The detection method according to claim 1, wherein the step of extracting the dynamic component of each mobile blade comprises de-contextualizing of said dynamic component, the de-contextualizing including, for the same rotation of the impeller, calculation of the difference between the dynamic component of the mobile blade and an average of the dynamic components of the other mobile blades of the impeller.

3. The detection method according to claim 1, wherein, if a single functioning sensor is detected in step d), the steps of determining f) and identifying g) are implemented for at least one engine speed range for which a set of blades are pre-identified as having the same vibrational behavior, the variation of the dynamic component being determined in step f) for the set of blades in said at least one engine speed range.

4. The detection method according to claim 1, wherein, if the operation of at least two sensors is detected in step d), the determining f) and identifying g) steps are implemented for each mobile blade of the impeller in the set of engine operating speeds, and the method also comprises the following step:
   h) confirmation of damage to said blade based on damage identified in step f).

5. The detection method according to claim 4, wherein the damage to the blade is confirmed in step h) only if the measurements of at least two sensors allow identification of the same damage to the blade.

6. A non-transitory computer readable medium including code instructions for the implementation of the method according to claim 1 when the code instructions are executed by a computer.

7. A detection system for detecting damage to one or more mobile blades constituting an impeller of an aircraft engine, the system comprising:
   acquisition means configured to measure the engine speed and to acquire, by means of a plurality of distinct and separate sensors, for each blade, measurements relating to the blade-tip passage time in line with each sensor, and
   processing means including a calculation module configured to calculate, for each sensor, a deflection of the tip of each blade based on the corresponding measurements of the sensor and the engine speed;
   wherein the processing means also comprise:

an extraction module configured to extract a dynamic component of deflection for each of the calculated deflections;

a detection module configured to detect the number of functioning sensors;

a selection module configured to select the dynamic components to be delivered to a processing module depending on the number of functioning sensors detected by the detection module;

a processing module configured to determine for at least one blade, a variation of the dynamic behavior of a blade for each functioning sensor based on the corresponding dynamic component;

a comparator configured to identify, for each blade for which a variation of the dynamic behavior has been determined, damage to a blade when the determined variation of dynamic behavior of said blade is greater than or equal to a variation threshold defining a damage threshold of the blade.

8. The detection system according to claim 7, wherein the module for extracting the dynamic component of each mobile blade comprises a sub-module for de-contextualizing the dynamic component, configured to accomplish, for the same rotation of the impeller, calculation of the difference between the dynamic component of the mobile blade and an average of the dynamic components of the other mobile blades of the impeller.

9. The detection system according to claim 7, wherein, if the functioning of a single sensor is detected by the detection module, the processing module and the comparator are respectively configured to determine a variation of deflection and to identify damage to a blade for at least one engine speed range for which the set of blades is pre-identified as having the same vibrational behavior.

10. The detection system according to claim 7, wherein, if the functioning of at least two sensors is detected by the detection module the processing module and the comparator are respectively configured to determine a variation of deflection and to identify damage to a blade for each mobile blade of the impeller in the set of engine speed ranges, and wherein the processing means also comprise a validation module configured to validate damage to a blade based on the damage identified by the comparator.

11. The detection system according to claim 10, wherein the validation module is configured to validate the damage to the blade only if the measurements of at least two sensors allow the identification of the same damage to the blade.

12. The detection system according to claim 7, wherein the sensors are tip-timing sensors installed in line with said impeller.

13. The detection system according to claim 7, wherein the processing means are integrated into a specific housing or into an existing electronic housing.

* * * * *